United States Patent [19]

Yamada et al.

[11] Patent Number: 5,897,958
[45] Date of Patent: Apr. 27, 1999

[54] MODIFIED TITANIUM OXIDE SOL, PHOTOCATALYST COMPOSITION AND PHOTOCATALYST COMPOSITION-FORMING AGENT

[75] Inventors: Ryoji Yamada, Yokohama; Iwakichi Sugiyama, Narashino; Hiroshi Suzuki, Yokohama, all of Japan

[73] Assignee: Asahi Glass Company Ltd., Tokyo, Japan

[21] Appl. No.: 08/731,993

[22] Filed: Oct. 23, 1996

[30] Foreign Application Priority Data

Oct. 26, 1995 [JP] Japan ................................. 7-279310
Dec. 8, 1995 [JP] Japan ................................. 7-320883

[51] Int. Cl.⁶ ............................. B01J 23/00; B32B 9/04
[52] U.S. Cl. ...................... 446/474; 502/242; 502/304; 502/309; 502/325; 502/340; 502/344; 502/345; 502/350; 502/351
[58] Field of Search .................................. 502/159, 350, 502/242, 305, 304, 309, 325, 340, 344, 345, 351; 423/610, 612; 252/309, 310, 313.1; 428/701, 446; 501/12; 106/287.19

[56] References Cited

U.S. PATENT DOCUMENTS 4,579,594  4/1986  Nanao et al. ..................... 106/287.24

OTHER PUBLICATIONS

Chemistry Letters, No. 9, pp. 841–842, 1995, Nobuaki Negishi, et al., "Preparation Of Transparent $T_1O_2$ Thin Film Photocatalyst And Its Photocatalytic Activity".
Chemical Abstracts, vol. 110, No. 6, Feb. 6, 1989, AN–41398u, JP–A–63 215 520, Sep. 8, 1988.
Database WPI, Derwent Publications, AN–81 80902D, JP–A–56 120 516, Sep. 21, 1981.
Database WPI, Derwent Publications, AN–96 246171, JP–A–08 099 041, Apr. 16, 1996.
Database WPI, Derwent Publications, An–94 275600, JP–A–06 205 977, Jul. 26, 1994.

*Primary Examiner*—Wayne Langel
*Attorney, Agent, or Firm*—Oblon, Spivak, McClelland, Maier & Neustadt, P.C.

[57] ABSTRACT

A modified titanium oxide sol obtained by treating an aqueous titanium oxide sol with a compound having a phase transfer activity.

7 Claims, No Drawings

MODIFIED TITANIUM OXIDE SOL, PHOTOCATALYST COMPOSITION AND PHOTOCATALYST COMPOSITION-FORMING AGENT

The present invention relates to a modified titanium oxide sol, a photocatalyst composition and a photocatalyst composition-forming agent.

Titanium oxide is known as a white pigment excellent in masking or covering power and is widely used in many industrial fields including fields of fibers and coating materials. Further, titanium oxide particles show a quantum size effect due to the energy band structure, like usual semiconductor fine particles.

Due to a high refractive index and a particle size dependency of the light absorption wavelength range brought by this quantum size effect, fine titanium oxide particles having a particle size of 0.1 $\mu$m exhibit a performance of shielding ultraviolet rays while permitting visible light rays to pass therethrough. Such a performance is known as an effective means to prevent adverse effects by ultraviolet rays without impairing the transparency, the beauty or the appearance and to lessen the ultraviolet rays, and it is utilized in various fields including fields of resins, fibers, coating materials, foods, agriculture and cosmetics.

On the other hand, titanium oxide is known also to be useful as a photocatalyst (Nature 237,37 (1972)). When semiconductor particles, like titanium oxide, absorb a light having an energy exceeding a forbidden band gap, an electron-hole pair forms an exciton. When such an exciton performs a charge-transfer or surface capturing reaction in its structural relaxation process, a reduction reaction or an oxidation reaction will respectively be proceeded, whereby conversion between light energy and chemical energy is carried out. Such a photocatalytic reaction using a semiconductor has attracted an attention as a method for producing a fuel directly from solar energy, but recently, an attention has been drawn to its application to environmental cleaning (Chemistry and Industry 48, 167 (1995)).

Titanium oxide is non-toxic by itself. Besides, in its photocatalytic reaction, the sun light can be used as the light source, and it provides a strong oxidizing power on the solid surface to oxidize many organic substances to their final state. Therefore, it is believed effective for the purpose of environmental cleaning such as a stainproofing, deodorant, antibacterial or detoxification purpose, and various specific proposals have heretofore been made. Further, the inherently hydrophilic clean surface of titanium oxide is always exposed by virtue of the stainproofing effect (J. Chem. Soc. Jpn., 8 (1986)), whereby the hydrophilic nature is maintained, and it is known to contribute to a performance of an antifogging property.

For example, it has been reported that in a system having titanium oxide particles dispersed in water, trichloroethylene is decomposed to carbon dioxide, chlorine ions, etc. (J. Catal. 82, 404 (1983)). However, it is difficult to separate and recover the dispersed titanium oxide from such a system, and such a method has not yet been industrially utilized.

Various methods have been proposed to fix titanium oxide. For example, it has been reported that a titanium oxide coating film prepared by applying a titanium oxide sol dispersed in water, on a substrate, followed by drying and then heat treatment at about 500° C., exhibits catalytic effects which are equivalent to particles having high catalytic activities (Chem. Lett., 723 (1994), Japanese Unexamined Patent Publication No. 278241/1994). However, the titanium oxide coating film thus formed is brittle, although it maintains a film form temporarily, thus leading to a drawback that it is easily broken and looses the catalytic effects.

Further, an attempt has been made to support titanium oxide particles on a silica gel (Bull. Chem. Soc. Jpn. 61, 359 (1988), J. Ceram. Soc. Jpn. 102, 702 (1994)). However, such an attempt has not been practical, since the catalyst concentration is thereby substantially low.

Further, antibacterial tiles have been proposed which are produced by a method wherein titanium oxide particles are added, or titanium oxide particles are fixed by a glazing agent (International Publication WO 94/11092). However, by such a method, the surface of the catalyst particles is mostly covered, so that the catalytic activities have been low, and not practical.

A sanitary ware has been proposed wherein, to supplement such inadequate activities, silver ions, etc. are further supported to improve the antibacterial property (Nikkei Materials & Technology (144) 57 (1994), Industrial Materials 43, 96 (1995)). However, the stainproofing property has been poor.

On the other hand, an attempt has been made to form a titanium oxide coating film on a substrate by means of a method for forming a metal oxide film by a sol-gel method. For example, it has been reported that trichloroethylene in water can be decomposed by using a titanium oxide-coated quartz plate or quartz tube (Japanese Unexamined Patent Publication No. 100378/1995, Journal of Water Environmental Association 17, 324 (1994)). However, such a titanium oxide coating layer is not industrially utilized, since the photocatalytic activity can be obtained for the first time by repeating the film-forming operation for from a few times to twenty times.

There has been an attempt to attain a high catalytic activity equivalent to particles by means of a CVD film (J. Photochem. Potobiol. A, 50, 283 (1989)), whereby a coating film can be formed in the form where fine particles are piled (J. Chem. Soc., Faraday Trans. 1, 81, 3117 (1985)), or a report that nicotine or tar of tobacco was decomposed by photo decomposition (Daily Industrial News Paper, Jan. 5, 1995). However, like the sol-gel method film, the catalytic activity is obtained only for the first time when the film thickness is made thick (Recently Development in Photocatalytic Reaction, 12 (1994)), and an industrial application of such a proposal has been difficult.

In spite of the fact that titanium oxide is capable of performing a function to clean the environment by using the inexhaustible-sunligt, its industrial utilization has not yet been very advanced.

Titanium oxide usually has two crystal phases of anatase type and rutile type as roughly classified. It is known that both phases exhibit photocatalytic activities. In general, the anatase type is considered to have higher effects, but such can not generally be determined, since there are many activating factors other than the crystal system.

A quantum size effect is observed with an energy band structure of fine semiconductor particles like titanium oxide, and the light absorption wavelength range is dependent also on the particle size. In order to effectively take out such various properties of titanium oxide particles depending upon the particular purpose, a technique for dispersing the prepared particles independently one from another, and a technique for holding or maintaining them in the dispersed state, are important.

Titanium oxide particles which are commercially available for a photocatalyst, have been made to have high catalytic activities by controlling the particle size, the active surface, etc. However, as described above, no effective fixing method has been found yet.

In general, fine particles form a secondary particle wherein a plurality of particles are strongly flocculated, and it is very difficult to disperse them to individual primary particles.

On the other hand, it is known that fine titanium oxide particles are readily deflocculated under an action of an acid or alkali to form an aqueous sol microscopically dispersed. However, such an aqueous titanium oxide sol is stable only in a pH range of not higher than 3 or not lower than 10. Accordingly, it has been difficult to incorporate them to coating materials, cosmetics, resins, etc.

Japanese Examined Patent Publication No. 33255/1995 discloses an aqueous titanium oxide sol which is stable in a neutral pH range. This sol is the one obtained by coating the particles with e.g. a polyvinyl alcohol and then removing an acidic substance by e.g. dialysis, and it is disclosed that such a sol can be incorporated to e.g. a water-soluble resin. However, the water-soluble resin is a very special material, and its industrial application is rather limited. Thus, it has a drawback that it can not be applied to a common resin solution or a solvent type coating material which is widely used.

An aqueous titanium oxide sol has also been proposed which is said to be miscible with an organic solvent. For example, Japanese Unexamined Patent Publications No. 283817/1987 and No. 232925/1995 disclose that an aqueous sol miscible with an organic solvent can be obtained by applying a special treatment to a sol having a special range of physical properties. However, even such a sol has drawbacks that the type of the solvent to which it is applicable, or the amount to be added, is limited, and even with a solvent to which it is applicable, if such a solvent is in the form of a resin solution or a solvent type coating material, it may not be incorporated thereto.

On the other hand, when a titanium oxide film is formed by a sol-gel method or sputtering on a substrate of e.g. glass, an anatase type phase is usually obtainable. Such an anatase type titanium oxide film has been reported to have no substantial interaction with a light in the vicinity of 400 nm, when the UV spectrum of the film is observed (J. Mater. Sci. 23, 2259 (1988), Bull. Chem. Soc. Jpn. 67, 843 (1994)). Accordingly, sufficient energy required for excitation has not been obtained from the sunlight, and no substantial catalytic activity has been observed.

When the anatase type obtained by a sol-gel method is baked at 1,000° C., it will be transformed to a rutile type phase (J. Mater. Sci. 28, 2353 (1993)). Further, a rutile type phase is obtainable also by baking at 650° C. by using a sol prepared from an alcohol solution of a titanium alkoxide and a diethanol amine (Molten Salt 31, 158 (1988)).

Such a rutile type shows turbidity, but it has a strong interaction with a light in the vicinity of 400 nm, whereby it is expected to show a strong activity also under the sunlight. However, in reality, such a film has also shown no substantial catalytic effects. This is believed to be attributable to the fact that the rutile type film is aligned with the (110) face having a small catalytic activity (Chemical Industry 1988, 482, Chem. Lett., 1994, 855).

Thus, the fixing method by means of a sol-gel method using a conventional titanium oxide sol, has problems such that the anatase type does not absorb the sunlight, and the rutile type has no activity and becomes turbid. Therefore, it has heretofore been difficult to effectively utilize such a titanium oxide film under the sunlight.

It is an object of the present invention to provide a modified titanium oxide sol which can be incorporated to an organic solvent or a solution of an organic solvent stably in an optional proportion.

Another object of the present invention is to provide a photocatalyst composition which exhibits excellent stainproofing, deodorant, antifogging and antibacterial effects and durability.

A further object of the present invention is to provide a photocatalyst composition-forming agent which is capable readily fixing titanium oxide particles, whereby a practical photocatalyst composition can be produced.

The present invention provides a modified titanium oxide sol obtained by treating an aqueous titanium oxide sol with a compound having a phase transfer activity.

Generally, a powder composed of fine particles tends to form aggregates wherein a plurality of particles are coagulated, whereby many surface properties may be wasted, and handling used to be difficult. Titanium oxide particles are the same, but they are known to be defloccu-lated with a certain specific agent to form a stable titanium oxide sol. Further, such a titanium oxide sol is widely commercially sold and readily available. However, such a titanium oxide sol is an aqueous titanium oxide sol using water as the dispersing medium, and in the presence of e.g. an organic solvent, it is likely to be readily flocculated, and the stability as a sol tends to be broken.

The present inventors have established a method whereby such an aqueous titanium oxide sol can be mixed with an organic solvent in an optional proportion. Namely, the modified titanium oxide sol of the present invention is produced by mixing and stirring an aqueous titanium oxide sol with a compound having a phase transfer activity.

A modified titanium oxide sol will not be flocculated and will be stably present even in an organic solvent. It is likewise stable in a solution and/or a dispersion of the precursor compound of a metal oxide and remains to be stable for a long period of time without flocculation of particles or without gelation of the precursor compound.

The aqueous titanium oxide sol which can be used in the present invention, may be a sol having titanium oxide particles deflocculated in water as a dispersing medium.

The titanium oxide particles may be amorphous or crystalline such as anatase type or rutile type. Preparation of such a sol is known, and the sol can easily be prepared. For example, methatitanic acid formed by heating and hydrolyzing an aqueous solution of titanium sulfate or titanium chloride, is neutralized with ammonia, and precipitated water-containing titanium oxide is collected by filtration, washed and dehydrated to obtain flocculates of titanium oxide particles. Such flocculates are deflocculated under the action of e.g. nitric acid, hydrochloric acid or ammonia, to obtain an aqueous titanium oxide sol.

In the present invention, it is possible to use also a sol prepared by dispersing the flocculates in water under a strong shearing stress without using such an acid or alkali. Further, an aqueous titanium oxide sol is commercially sold as a titania sol and is readily available.

An aqueous titanium oxide sol may also be prepared by deflocculating commercially available titanium oxide particles under an action of an acid or alkali, or by dispersing them in water under a strong shearing stress, and the sol prepared in such a manner, can also be employed.

The aqueous titanium oxide sol is preferably an aqueous titanium oxide sol having titanium oxide particles having an average particle size of from 1 to 300 nm dispersed. Such titanium oxide particles constitute a photocatalyst composition. If the average particle size is smaller than 1 nm, the wavelength range of light having an interaction tends to be narrow, and the particles tend to show no activity under the sunlight energy. If it exceeds 300 nm, it tends to be difficult to obtain high activities. The average particle size is more preferably from 1 to 100 nm.

In the present invention, the average particle size means an average particle size of a mixture of primary particles and flocculated particles.

As the compound having a phase transfer activity, a known compound may be used. Such a compound is disclosed, for example, in "Phase Transfer Catalysts" by W. P. Weber et al.

In the present invention, "a compound having a phase transfer activity" is defined to be a compound which forms a third phase at the interface between different first phase and second phase and which dissolves and/or solubilizes the first, second and third phases mutually.

Specifically, it may preferably be a crown ether, a quaternary ammonium compound, a quaternary phosphonium compound, a cyclodextrin, or a polyalkylene glycol such as a polyethylene glycol or a polyproplyene glycol.

The compound having a phase transfer activity is preferably a soluble nonionic compound, so that the treated aqueous titanium oxide sol is thereby able to exhibit a stabilized dispersibility for a long period of time.

Particularly preferred are crown ethers, polyethylene glycols or cyclodextrins.

The above-mentioned modified titanium oxide sol prepared by treating an aqueous titanium oxide sol with such a compound having a phase transfer activity, is more stable in a wide range of environments.

The modified titanium oxide sol is obtained by mixing and stirring the aqueous titanium oxide sol and the compound having a phase transfer activity. It is particularly preferred to gradually add the compound having a phase transfer activity, while stirring the aqueous titanium oxide sol, so that the sol can be modified while maintaining the excellent dispersibility of the aqueous titanium oxide sol.

The modified titanium oxide sol of the present invention is practically used as mixed with a solvent or dispersing medium of a binder, or a solvent or dispersing medium of a binder precursor (which will be generally referred to as a binder solvent). As such a binder solvent, an organic solvent is preferred, since an organic solvent is used as a solvent for precursor compounds of many metal oxides. If a conventional titanium oxide sol is added to an organic binder solvent, flocculation of particles and gelation of the binder are likely to occur. Whereas, by using the modified titanium oxide sol of the present invention, such flocculation or gelation can be avoided.

In the present invention, the compound having a phase transfer activity is preferably soluble in an organic solvent, since an organic solvent is preferred as the binder solvent. Particularly preferred is a compound soluble in an alcohol, since an alcohol-soluble compound is stable in many organic solvents.

When a low molecular weight compound such as diethylene glycol or triethylene glycol which is a polyalkylene glycol, is used as the compound having a phase transfer activity, it is stable for a while after being mixed with an organic solvent, but it tends to form precipitates or undergo gelation upon expiration of a few days in many cases.

Accordingly, when a polyethylene glycol is used as the compound having a phase transfer activity, the molecular weight is preferably at least 300 on average, so that it is capable of maintaining a stabilized dispersed state even in an organic solvent.

On the other hand, it is possible to use a polyethylene glycol having a high molecular weight such as an average molecular weight of 6,000 or 8,000, or even higher. However, in such a case, if an organic solvent or the like is mixed thereto all at once, separation or precipitation is likely to occur in many cases. Accordingly, the average molecular weight is preferably at most 5,000.

The modified titanium oxide sol thus obtained can be easily mixed in an optional proportion also to a lower alcohol such as methanol, ethanol or propanol to obtain a stable dispersion.

Further, as a dispersing medium, an aliphatic hydrocarbon such as hexane, cyclohexane or heptane, an aromatic hydrocarbon such as benzene, toluene or xylene, an alcohol such as butanol, pentanol or hexanol, a polyhydric alcohol, such as ethylene glycol, propylene glycol, hexylene glycol or glycerol, a glycol derivative such as ethylene glycol monoethyl ether, ethylene glycol acetate monomethyl ether, a ketone such as acetone, methyl ethyl ketone or acetophenone, an ester such as ethyl acetate or methyl benzoate, an ether such as tetrahydrofuran or dioxane, an amide such as dimethylformamide or dimethylacetoamide, an amine such as dimethylamine or triethanolamine, a halogenated compound such as chloroform, methylene chloride or carbon tetrachloride and others such as acids, alkalis, diacetone alcohol, dimethyl sulfoxide, tetramethylene sulfone and nitrobenzene, may be mentioned. These compounds may be used alone or in combination as a mixture of two or more of them, as the dispersing medium.

Thus, the modified titanium oxide sol of the present invention can readily be incorporated to various organic solutions of resins or solvent type coating materials to form stable dispersions.

The present invention also provides a photocatalyst composition containing titanium oxide formed from the modified titanium oxide sol obtained by treating an aqueous titanium oxide sol with the compound having a phase transfer activity, and an agent for forming such a photocatalyst composition.

The photocatalyst composition of the present invention preferably comprises titanium oxide particles (first component) formed from the modified titanium oxide sol and a metal oxide (second component) formed from the precursor compound of a metal oxide. By such a constitution, high catalytic activities and excellent form-maintaining properties can be obtained.

The photocatalyst composition of the present invention is the one wherein the first component having high catalytic activities, is fixed by the second component, and the first and second components are mutually complementary to each other to provide high catalytic activity, form-stability and durability.

In the present invention, "the composition" is not particularly limited with respect to its form, so long as it is constituted by the first and second components.

As mentioned above, active sites of a photocatalyst are on the surface. Accordingly, a particle form is most effective. However, handling of particles is difficult not only during the reaction but also after the reaction. On the other hand, with a bulky block form, the utilization efficiency of the surface is low. From the viewpoint of the molding processability, handling efficiency, utilization efficiency, etc., a film form is most useful.

In the case of a film form, the thinner the film thickness, the higher the utilization efficiency. However, from the viewpoint of the moldability, the film thickness is preferably at least 5 nm. Even if the thickness is increased, the increase in the utilization efficiency tends to be less, and the film thickness is preferably at most 100 μm.

The titanium oxide particles of the first component will be excited upon absorption of light from e.g. the sunlight, to provide photocatalytic activities. The titanium oxide particles of the first component are present substantially in the form of primary particles to realize high catalytic effects.

The titanium oxide particles of the first component are preferably crystalline, since high photocatalytic effects can thereby be provided. It is particularly preferred that at least 60% of the titanium oxide particles are of an anatase type.

The titanium oxide particles of the first component may contain rutile type crystals within a range not to exceed 40%. The rutile type crystals will be excited even with a light having lower energy, than the anatase type. Accordingly, it is expected that excitons formed in the rutile phase act on the anatase phase, to further increase the activities of the photocatalyst composition of the present invention.

The metal oxide of the second component preferably contains at least titanium oxide, which serves as a binder to fix the titanium oxide particles of the first component and to maintain the form, and at the same time contributes to providing photocatalytic effects.

The content of titanium oxide in the metal oxide of the second component is preferably at least 20 wt % to obtain high catalytic activities, although it depends also on the content of the titanium oxide particles of the first component.

Titanium oxide in the second component is usually considered to have no substantial catalytic activities just like a thin film formed by a sol-gel method. However, in the present invention, it is considered that a part of light energy absorbed by the titanium oxide particles of the first component which are microscopically dispersed, is transmitted to titanium oxide of the second component and serves as exciting energy to provide the catalytic activities.

Oxides other than titanium oxide may, for example, be zinc oxide, aluminum oxide, silver oxide, silicone oxide, zirconium oxide, tin oxide, cerium oxide, tungsten oxide, iron oxide, copper oxide, strontium titanate, or barium titanate.

The precursor compound to form a metal oxide of the present invention, is not particularly limited so long as it is a compound which will eventually be converted to a metal oxide. From the viewpoint of convenience in handling, at least one member selected from the group consisting of a metal alkoxide, a metal acetylacetonate, a metal carboxylate and a metal chelate, is preferred.

The titanium oxide particles of the first component constituting the photocatalyst composition of the present invention, are preferably from 1 to 300 nm. If the size is less than 1 nm, the light wavelength range showing an interaction tends to be narrow, and no activities tend to be obtained by sunlight energy. On the other hand, if the size exceeds 300 nm, it tends to be difficult to obtain a tough molded product of the photocatalyst composition.

The content of the titanium oxide particles of the first component is preferably from 0.5 to 75 wt %, based on the photocatalyst composition. With an amount of at least 0.5 wt %, light energy can effectively be taken in, and with an amount of at most 75 wt %, the particles can firmly be fixed, and both high photocatalytic activities and durability can be realized.

The content of the metal oxide of the second component is preferably at least 25%, based on the photocatalyst composition, so that excellent form-maintaining property can be obtained. A photocatalyst composition of the present invention can be formed by using a photocatalyst composition-forming agent comprising the modified titanium oxide sol of the present invention and a precursor compound of a metal oxide (hereinafter referred to as the photocatalyst composition-forming agent of the present invention).

It is effective to use the modified titanium oxide sol of the present invention and the precursor compound of a metal oxide by mixing them in a common solvent and/or a common dispersing medium.

As such a solvent and/or a dispersing medium, an organic solvent may be used. Many precursor compounds of metal oxides can readily be dissolved and/or dispersed in organic solvents. Further, in an organic solution and/or dispersion of the precursor compound of a metal oxide, the modified titanium oxide sol can be mixed stably.

The photocatalyst composition-forming agent of the present invention thus formed may be coated, dried and heat-treated to form a film made of the photocatalyst composition of the present invention.

The coating method may, for example, be spray coating, dip coating, spin coating, screen printing or flexo printing. When the photocatalytic composition-forming agent of the present invention is used, thin-film forming can be facilitated, and the catalytic activities of the thin film thereby obtained will be high. Further, it is possible to readily form a transparent film or a translucent film, so that light energy can effectively be taken in. It is possible to prepare a transparent film by maintaining the average particle size at a level of at most 100 nm by controlling the average particle size of the titanium oxide particles of the first component, the composition and the refractive index of the metal oxide of the second component, and the film-forming process.

Such a transparent film can be applied to a substrate made of a transparent material, and it is capable of imparting a new function without impairing the appearance or the outlook of the substrate. Glass is suitable as the substrate made of a transparent material.

The photocatalyst composition of the present invention oxidizes many organic materials to their final stage and thus exhibits antibacterial, stainproofing, deodorant or antifogging effects. The photocatalyst composition of the present invention formed into a film, can be applied to substrates of various shapes. Therefore, it can impart antibacterial, stainproofing, deodorant or antifogging properties to various products.

Glasses, ceramics, tiles, cements, concretes, etc., having the photocatalyst composition of the present invention applied on their surface, can be used for windows, mirrors, walls, roofs, floors, ceilings or interior materials. The photocatalyst composition of the present invention is capable of preventing deposition of stains or formation of algae, it can effectively used for a light-receiving surface of a solar cell or a solar water heater. Further, it may be applied on the surface of e.g. glass beads or balloons, which are then disposed in water or at the surface of water to effectively use them for cleaning the water.

The modified titanium oxide sol of the present invention is capable of maintaining the stable dispersed state for a long period of time even in an organic solvent.

The reason why the aqueous titanium oxide sol can not be dispersed in an organic solvent, was considered to be not a question of dispersibility of particles but attributable to the fact that the structure formed by hydrated titanium hydronium ions and water in the vicinity thereof, is destroyed by the organic solvent which comes close thereto at the time of the phase transformation.

Accordingly, it was expected that if it is possible to reinforce such a structure so that the structure can be durable to changes of the environment, the dispersion can be stabilized even in an organic solvent.

As such a reinforcing agent, the above described compound having a phase transfer activity, has been found to be particularly effective. Namely, the compound having a phase transfer activity to be used in the present invention, serves to reinforce the structure formed by hydrated titanium hydronium ions and/or water in the vicinity thereof, around such ions and/or water. Further, to an organic solvent close thereto, such a compound serves to change its configuration, etc. to moderate its attack and thus serves to maintain the above-mentioned structure.

The photocatalyst composition of the present invention is excited by light energy obtainable under a usual environment, such as the sunlight, to exhibit high catalytic activities. As the light energy source, the photocatalyst composition of the present invention is effective also against light from a fluorescent lamp which is a common interior lamp. Further, it is effective also against light from a black light, a filament lamp, a xenon lamp or a mercury lamp.

The photocatalyst composition of the present invention functionally combines up-take of light energy and catalytic activities to provide highly efficient photocatalytic activities.

In order for the catalyst to exhibit its function, it takes a route such that a) it absorbs light energy, b) it forms an exciton with the absorbed energy, and c) the exciton is transferred to the reaction site to exhibit its catalytic function. Titanium oxide is considered to be the most practical excellent photocatalyst at present.

The wavelength of light having an energy corresponding to the band gap is about 400 nm. Accordingly, fine titanium oxide particles absorb sufficient exciting energy even from the sunlight, and excitons thereby formed will move to the surface to exhibit the catalytic activities.

The titanium oxide particles of the first component constituting the photocatalyst composition of the present invention are fixed without impairing the photo activity of the titanium oxide particles, and with such activities, they provide very high catalytic effects.

On the other hand, the metal oxide of the second component constituting the photocatalyst composition of the present invention serves to provide a function to fix the titanium oxide particles of the first component to the useful positions and configuration. Further, titanium oxide in the second component exhibits high activities even in the form of a thin film, whereby it used to be difficult to effectively take out the catalyst activities.

This is believed to be attributable to the fact that the titanium oxide particles of the first component interact with titanium oxide of the second component in the thin film, to activate it. Namely, the excitons in the above step (c) move to the interface of particles/film and act on titanium oxide of the second component in the film, to form fresh excitons. Such excitons will move to the film surface to exhibit high catalytic effects.

Now, the present invention will be described in further detail with reference to Examples. However, it should be understood that the present invention is by no means restricted to such specific Examples.

In the following Examples, Examples 1 to 8 represent the present invention, and Examples 9 to 12 represent Comparative Examples.

EXAMPLE 1

200 parts by weight of a commercially available aqueous titanium oxide sol (when a film is formed from this sol, the average particle size of titanium oxide particles in the film is from 20 to 30 nm) containing 30 wt % of anatase type titanium oxide having an average particle size of 7 nm (the value indicated in the catalogue), was put into a 500 ml flask, and 100 parts by weight of polyethylene glycol having an average molecular weight of 600 was added and mixed thereto with stirring. The liquid temperature rose to 49° C. at that time. Stirring was continued for 15 minutes, and when the liquid temperature became 32° C., the liquid was taken out to obtain a milky white modified titanium oxide sol (a). The sol (a) was stable even after being left to stand for 6 months at room temperature. The average particle size of the titanium oxide particles in a film made of the sol (a) was from 20 to 30 nm.

Further, a dispersion prepared by mixing 100 parts by weight of ethanol to 100 parts by weight of the sol (a), was left to stand at room temperature for 6 months, whereby no change was observed.

EXAMPLE 2

Ethanol was added to a solution prepared by mixing and stirring 340 parts by weight of titanium butoxide, 200 parts by weight of acetylacetone and 264 parts by weight of hexylene glycol, to obtain a pale brown transparent titanium oxide precursor (chelate) solution (A). The concentration of the solution (A) calculated as titanium oxide was 8 wt %.

50 parts by weight of this solution (A) and 20 parts by weight of the sol (a) of Example 1 were mixed and stirred to obtain a titanium oxide film-forming agent (1). The film-forming agent (1) was left to stand at room temperature for 6 months, whereby no change was observed, and it was stable.

This film-forming agent (1) was spin-coated on a commercially available float glass sheet and dried at 120° C., followed by baking at 500° C. for 10 minutes, to obtain a glass sheet provided with a transparent titanium oxide film wherein titanium oxide particles (average particle size: from 30 to 40 nm) formed from the sol (a) and a titanium oxide binder formed from the solution (A) were homogeneously distributed.

EXAMPLE 3

40 parts by weight of β-cyclodextrin was added and mixed to 100 parts by weight of a commercially available titanium oxide sol (average particle size of titanium oxide particles: 10 nm) which had a titanium oxide concentration of 15% and which was convertible to an anatase type by baking at 500° C., with stirring, to obtain a milky white modified titanium oxide sol (b).

Then, in the same manner as in Example 2 except that 40 parts by weight of the sol (b) was used instead of 20 parts by weight of the sol (a) in Example 2, to obtain a titanium oxide film-forming agent (2). The film-forming agent (2) was left to stand at room temperature for 6 months whereby no change was observed, and it was stable. The film-forming agent (2) was spin-coated on a commercially available float glass sheet to obtain a glass sheet provided with a transparent titanium oxide film in the same manner as in Example 2.

EXAMPLE 4

284 parts by weight of titanium isopropoxide, 130 parts by weight acetylacetone and 1,000 parts by weight of hexylene glycol were mixed and stirred to obtain a solution, and hexylene glycol was further added thereto to obtain a pale brown transparent titanium oxide precursor solution (B). The concentration of the solution (B) calculated as titanium oxide was 5 wt %.

Then, 100 parts by weight of the solution (B) and 26 parts by weight of the sol (b) were mixed and stirred to obtain a titanium oxide film-forming agent (3). This film-forming agent (3) was coated on a commercially available float glass sheet by flexo printing and dried at 120° C., followed by baking at 500° C. for 10 minutes, to obtain a glass sheet provided with a transparent titanium oxide film.

EXAMPLE 5

40 parts by weight of a commercially available ultrafine particulate titanium oxide of anatase type having an average particle size of 24 nm and 200 parts by weight of distilled water, were put into a ball mill and intensely stirred for 80 hours for peptization, followed by sieving to obtain an aqueous titanium oxide sol. 40 parts by weight of PEG 400 was added to 100 parts by weight of this sol, and the mixture was stirred to obtain a milky white modified titanium oxide sol (c).

Then, 100 parts by weight of the solution (B) and 45 parts by weight of the sol (c) were mixed and stirred to obtain a titanium oxide film-forming agent (4). In the same manner as in Example 4 except that the film-forming agent (3) in Example 4 was changed to the film-forming agent (4), a glass sheet provided with a transparent titanium oxide film was obtained.

EXAMPLE 6

A modified titanium oxide sol (d) was prepared in the same manner as in Example 5 except that instead of 40 parts of the commercially available ultrafine particulate titanium oxide of anatase type having an average particle size of 24 nm used in Example 5, 30 parts by weight of a commercially available ultrafine particulate titanium oxide of anatase type having an average particle size of 26 nm and 10 parts by weight of a commercially available ultrafine particulate titanium oxide of rutile type having an average particle size of 40 nm, were used.

In the same manner as in Example 5 except that the sol (d) was used instead of the sol (c), a glass sheet provided with a transparent titanium oxide film, was obtained.

EXAMPLE 7

284 parts by weight of titanium isopropoxide, 31 parts by weight of tetraethoxysilane, 200 parts by weight of acetylacetone and 300 parts by weight of hexylene glycol were mixed and stirred to obtain a solution, and ethanol was added to the solution to obtain a metal oxide precursor solution (C) containing pale brown transparent titanium oxide. The concentration of the solution (C) calculated as the metal oxide was 10 wt %.

Then, 50 parts by weight of the solution (C) and 50 parts by weight of the sol (b) were mixed and stirred to obtain a titanium oxide film-forming agent (5). In the same manner as in Example 2 except that the film-forming agent (1) used in Example 2 was changed to the film-forming agent (5), a glass sheet provided with a transparent titanium oxide film was obtained.

EXAMPLE 8

A modified titanium oxide sol (e) was prepared in the same manner as in Example 5 except that instead of the commercially available ultrafine particulate titanium oxide of anatase type having an average particle size of 24 nm used in Example 5, a commercially available ultrafine particulate titanium oxide of rutile type having an average particle size of 40 nm, was used.

In the same manner as in Example 5 except that the sol (e) was used instead of the sol (c), a glass sheet provided with a transparent titanium oxide film was obtained.

EXAMPLE 9

Preparation of a titanium oxide film-forming agent (7) was attempted in the same manner as in Example 2 except that instead of 20 parts by weight of the sol (a) used in Example 2, 28 parts by weight of the commercially available titanium oxide sol in Example 3 was used by itself. However, when stirring stopped, a white precipitate sedimented, and when the film-forming agent (7) was left to stand at room temperature for one day, it underwent gelation.

EXAMPLE 10

A glass sheet provided with a transparent titanium oxide film was prepared in the same manner as in Example 2 except that the solution (A) was used by itself as the titanium oxide film-forming agent in Example 2.

EXAMPLE 11

A glass sheet provided with a transparent titanium oxide film was prepared in the same manner as in Example 10 except that a step of spin coating and drying in Example 10 was repeated three times to increase the film thickness.

EXAMPLE 12

A commercially available float glass sheet provided with no film, was prepared.

With respect to each of glass sheets of Examples 2 to 8 and 10 to 12, the stain removal ratio and the contact angle of water were measured. The results are shown in Table 1. For the stain removal ratio, each glass sheet was marked with an ethanol solution containing 5% of a commercially available water-soluble dye and then exposed to the sunlight for from 10 o'clock to 16 o'clock, whereupon the stain removal ratio was obtained by the following formula.

Stain removal ratio (%)=$(\Delta E_1-\Delta E_2)/\Delta E_1 \times 100$, where $\Delta E_1$ is the color difference of the stain-marked glass sheet from the film-coated glass sheet, and $\Delta E_2$ is the color difference of the stain marked glass exposed to the sunlight for 6 hours, from the film-coated glass sheet. For the contact angle of water, a test specimen left to stand at room temperature for one month, was irradiated with black light for one hour, whereupon the contact angle of water was measured by a contact angle meter, manufactured by Kyowa Kaimen Kagaku K.K.

As is evident from Table 1, the glass sheets provided with the films made of the photocatalyst compositions of the present invention had high stain removal ratios and hydrophilic surface.

Separately from the above evaluation, evaluation was carried out also with respect to the deodorant property, the antifogging property, the antibacterial property, the adhesion to the substrate, the strength and the durability, whereby the glass sheets of Examples 2 to 8 were found to exhibit adequate performance in each of these properties without any practical problem.

TABLE 1

|  | Film thickness (μm) | Stain removal ratio (%) | Contact angle of water (degree) |
|---|---|---|---|
| Example 2 | 0.1 | 102 | ≈0 |
| Example 3 | 0.05 | 100 | ≈0 |
| Example 4 | 0.16 | 100 | ≈0 |
| Example 5 | 0.11 | 98 | ≈0 |
| Example 6 | 0.12 | 104 | ≈0 |
| Example 7 | 0.07 | 101 | ≈0 |
| Example 8 | 0.1 | 44.4 | 3.5 |
| Example 10 | 0.07 | 9.1 | 60 |
| Example 11 | 0.18 | 19.6 | 28 |
| Example 12 | — | 7.3 | 31 |

The modified titanium oxide sol of the present invention can be mixed in an optional proportion with an organic solvent, and it can be dispersed in an optional proportion also in an organic solvent or dispersing medium of a resin.

By using the modified titanium oxide sol of the present invention, titanium oxide particles can be incorporated uniformly to various resin films, sheets, fibers, or various coating materials, coating agents or cosmetics, whereby it is possible to effectively impart a function such as control of transmittance or shielding of light, reducing ultraviolet rays or controlling photo activities.

Further, the modified titanium oxide sol of the present invention can be blended to a solution or dispersion having an ability of forming a film of a metal oxide.

By using the photocatalyst composition-forming agent of the present invention, fixing of titanium oxide particles can be facilitated to obtain a practical photocatalyst composition. Further, preparation of a transparent film is easy, and processing into various shapes is possible. The obtained composition provides a high level of adhesion to the substrate and is excellent also in the strength, durability, etc.

Further, the photocatalyst composition of the present invention exhibits excellent stainproofing, deodorant, antifogging and antibacterial properties as well as durability, under the sunlight or under the interior lamp light.

What is claimed is:

1. A photocatalyst composition-forming agent, comprising:

a titanium oxide sol, which is prepared by treating an aqueous titanium oxide sol with a compound having a phase transfer activity, in combination with at least one compound from which a metal oxide is formed selected from the group consisting of a metal alkoxide, a metal acetylacetonate, a metal carboxylate and a metal chelate.

2. The photocatalyst composition-forming agent of claim 1, wherein said compound having a phase transfer activity is a soluble nonionic compound.

3. The photocatalyst composition-forming agent of claim 1, wherein the compound from which a metal oxide is formed is a precursor compound of titanium oxide.

4. The photocatalyst composition-forming agent of claim 2, wherein said nonionic compound is a crown ether, a polyethylene glycol or a cyclodextrin.

5. A photocatalyst composition prepared by applying the photocatalyst composition-forming agent of claim 1 to a substrate.

6. The photocatalyst composition of claim 5, which is in the form of a film.

7. A glass article, comprising:

a glass substrate; and the photocatalyst composition of claim 5 applied thereto.

* * * * *